United States Patent [19]

Hansen

[11] Patent Number: 5,060,708

[45] Date of Patent: Oct. 29, 1991

[54] TIRE MOUNTING AND DISMOUNTING APPARATUS

[76] Inventor: Arne H. Hansen, Virringvej 2, DK-8660 Skanderborg, Denmark

[21] Appl. No.: 667,645

[22] Filed: Mar. 11, 1991

Related U.S. Application Data

[63] Continuation of Ser. No. 385,463, Jul. 27, 1989, abandoned.

[30] Foreign Application Priority Data

Jul. 29, 1988 [DK] Denmark .............................. 4234/88

[51] Int. Cl.⁵ ............................................. B60C 25/135
[52] U.S. Cl. ........................................ 157/1.24; 157/19
[58] Field of Search ..................... 157/1.24, 1.28, 19

[56] References Cited

U.S. PATENT DOCUMENTS

| | | | |
|---|---|---|---|
| 1,333,150 | 3/1920 | Bartlett | 157/19 |
| 2,201,982 | 5/1940 | Bazarek | 157/19 |
| 2,213,535 | 9/1940 | Seip | 157/19 |
| 2,546,849 | 3/1951 | Branick | 157/19 |
| 2,920,664 | 1/1960 | Lomen et al. | 157/1.24 X |
| 3,267,977 | 8/1966 | Turpin | 157/1.24 X |

*Primary Examiner*—James G. Smith
*Attorney, Agent, or Firm*—Antonelli, Terry, Stout & Kraus

[57] ABSTRACT

The rotatable wheel holder of a tire mounting apparatus is provided laterally protruding from one end of a horizontal carrier arm, the other end of which is secured in a pivotal manner to a carrier block, which is height adjustably held by an upright, such that the carrier arm can be pivoted about an axis parallel with its own length direction. Hereby the wheel holder may receive and deliver a wheel standing upright on the floor, and the wheel may be raised to a convenient working height and be tilted both ways to a lying working position. With the wheel holder pointing downwardly the tire may be dismounted and released simply by dropping.

4 Claims, 2 Drawing Sheets

TIRE MOUNTING AND DISMOUNTING APPARATUS

This application is a continuation of application Ser. No. 385,463, filed July 27, 1989 now abandoned.

BACKGROUND OF THE INVENTION

The present invention relates to an apparatus for mounting and dismounting tires, especially large tires, and of the type which has a rotatable wheel holder on which the wheel felly may be clamped, and various associated tools and holder means for such tools, preferably a pressure disc for pressing free the tire edges and a universal tool for forcing the tire edge over the felly edge by mounting and dismounting.

The known apparatuses of this kind are of two principal types, where the axis of rotation of the wheel holder is vertical or horizontal, respectively, i.e. with a felly holder disc positioned either as a horizontal table or placed upright. Both types have advantages and disadvantages, the lying wheels being easy to work with, but difficult to mount and remove, while the vertical wheels are easy to mount and to remove, but difficult to work with, especially when wheels of the so-called locking ring type are concerned.

The present invention provides for an apparatus of the said type, where the wheel holder is placed on a carrier portion, which relative to an apparatus frame is pivotal in such a manner that the wheel holder axis is rotatable through the horizontal plane between an obliquely or straightly upwardly projecting position and an obliquely or straightly downwardly projecting position, the associated tools being provided so as to be operative relative to wheels fastened to the wheel holder in both the upwardly and the downwardly projecting position of its axis.

Hereby it is provided that the wheel holder axis may be brought to assume a position, i.e. a horizontal or a slightly upwardly inclined position, in which the wheel is mainly "lying", preferably entirely horizontal, so that it is easy to work with. In those cases where the tire is to be removed entirely for reparation or change, this apparatus will make it possible to loosen the tire from the felly with the wheel holder turning downwards, such that aided by gravity the tire may be loosened by a substantially reduced pressure force and simply fall from the felly without any strenuous manual assistance as required hitherto. This will be a very substantial advantage for the handling of heavy tires, e.g. for trucks, tractors, and constructors' machines. When mounting the old tire or a new one, the tire may be conveyed to the felly while this assumes a vertical position or a slightly vertically inclined position by which it is easy to bring the tire into initial connection with the felly, such that thereafter the felly and the tire may be pivoted to a more advantageous, horizontal mounting position without the heavy tire needing to be handled manually.

When delivering the wheel from the apparatus, the wheel may be turned to a vertical position, optionally slightly outwardly inclined from the wheel holder, such that it may easily be released from its holding engagement with the wheel holder, and thereafter be rolled away.

It will be a further possibility that the wheel or especially a tire dismounted therefrom can be released from the apparatus in a "lying" position, in being released from the wheel holder with this being turned downwards such that the wheel or the tire in a horizontal position can fall down onto a horizontal base, which may be provided with horizontal conveyor rollers, by means of which the lying wheel or tire may easily be drawn away from the apparatus.

It is known in the art that for pressing the tire edges free on both felly sides, two pressure discs may be used, one for each side of the mounted wheel. The invention provides for a correspondingly advantageous possibility by means of a single pressure disc, this being caused to cooperate with first one side of the tire, then the other side, by turning the wheel holder.

Preferably the wheel holder is placed on a carrier member which also carries the motor by means of which the wheel holder may be pivoted, which carrier portion as a whole being pivotable for turning the wheel holder between the upwardly and the downwardly projecting position. The carrier member is advantageously mounted so as to be rotatable or displaceable also for allowing the wheel holder to be moved in a vertical direction, such that with its holding shaft oriented "lying" it may receive and deliver an upstanding wheel, respectively pivot the wheel through its vertical position and yet bring the now lying wheel down to a comfortable working height, which is of course especially relevant for very large wheels.

The same height mobility of the wheel holder carrier member may then also be utilized for producing the clamping movement in the orientation of the wheel which is necessary for enabling the pressure disc to perform its operation.

BRIEF DESCRIPTION OF THE DRAWINGS

In the following the invention is explained in more detail with reference to the drawing in which.

DETAILED DESCRIPTION

Figure 1:
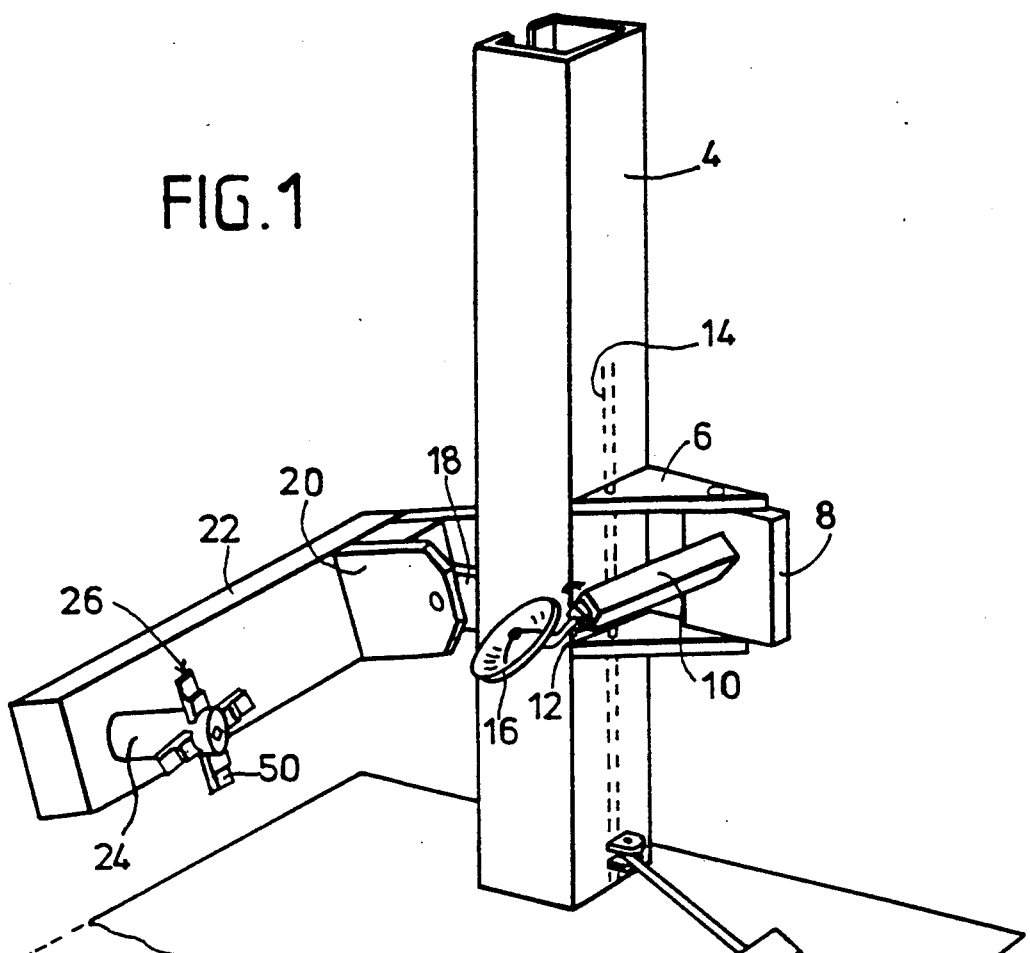
FIG. 1 is a front perspective view of an apparatus according to the invention.

The apparatus shown has a base plate member 2 and a profiled post 4 projecting upwards therefrom and at the front side of which (towards the right) a carrier bracket 6 is placed for horizontal rotatable fastening of a foot portion 8 of a horizontally projecting tool arm 10 of rectangular cross sectional shape. The arm 10 has a telescopic extension 12 which may be axially displaced by means of an interior cylinder, while the arms 10 and 12 may be rotated about their longitudinal axis by means of a handle 11 on the arm 10. Optionally also the bracket 6 may be moved up and down along the post 4, which is indicated by means of a guiding rod 14 shown in dotted lines. On the outer arm 12 is placed an inclined pressure disc 16 of the type which is usual in connection with tire mounting apparatuses.

Adjacent the rear side of the post 4 is placed a heavy carrier bracket 18 which is height mobile and height fixable by means of appropriate raising/lowering means inside the post 4. This bracket carries a horizontal axle pin on which is rotatably mounted a base portion 20 of a laterally projecting, horizontal wheel holder arm 22, which at its free end has a rotary shaft 24 projecting from the arm 22 parallel to the base portion 20, said shaft ending in a wheel holder 26 having clamping means for fastening the wheel. The wheel holder 26 is placed approximately in level with the horizontal axle pin of the bracket 18.

Figure 3:
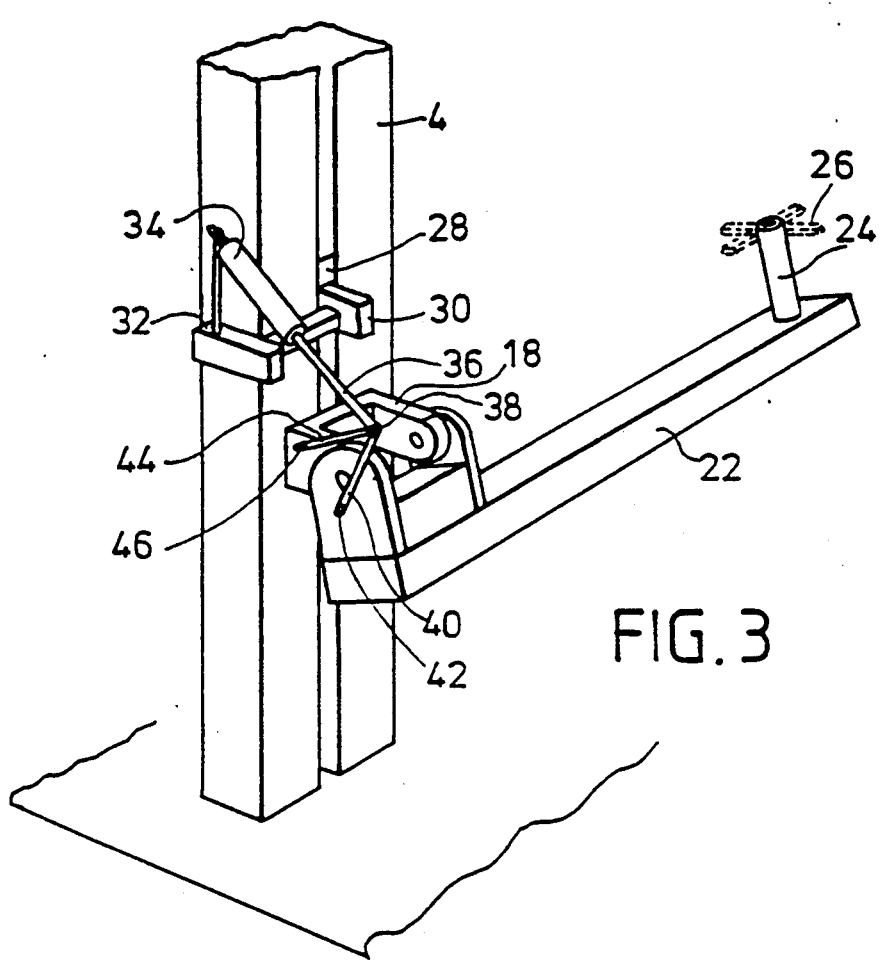
FIG. 3 is a rear perspective view of the same.
Figure 4:
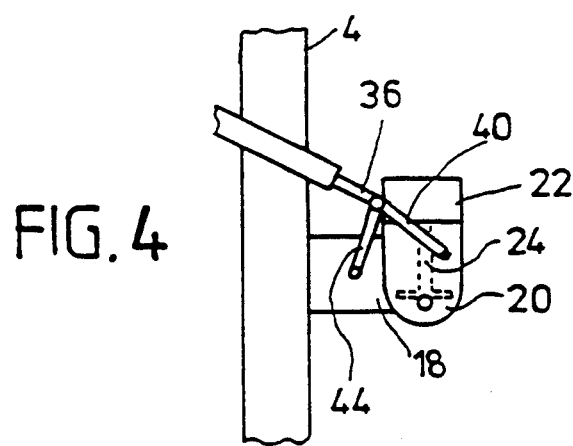
FIG. 4 is a right-angle view of a part of the apparatus seen from the opposite side.

As indicated in FIG. 3 the bracket 18 is placed on a guiding block 28 mounted inside the post 4, which block has a protruding portion 30 above the bracket 18 and carries an outer base 32 for the rear end of a cylinder 34, the piston rod 36 of which is connected to a joint 38, from which a pivot lever 40 branches off to a pivot 42 on the base portion 20, while another pivot lever 44 is connected to a pivot 46 on the bracket 18. Thus, generally the upper end of the cylinder 34 is fixedly but pivotally connected to the bracket 18, and by means of the lever system 40,44 the cylinder 34 will be operable for producing a rotation of the base portion 20 between a vertically downwardly projecting and a vertically upwardly projecting position. This implies that also the wheel holder shaft 24 is pivotal between a position in which it projects upwards from the arm 22 (FIG. 3), and a position in which it projects downwards from this arm (FIG. 4), and hereby it may be brought to assume an intermediate position in which it may be slightly upwardly inclined as indicated in Fig. 1.

The wheel holder 26 comprises a base element 50 for centered reception of a wheel felly and a clamp disc 52, which by means of a clamping screw 54 may press the felly against the base element 50 by cooperation with a screw hole at the end of the shaft 24. The clamp screw 54 is provided with a central opening through which a polygonal shaft 56 may be inserted in a corresponding polygonal central opening in a rigid core pin for the tubular shaft 24, the shaft 56 being part of a tire tool 58 which has an active end portion 60 for raising and lowering, respectively, of a tire edge past a holder edge on an associated wheel felly.

Figure 2:
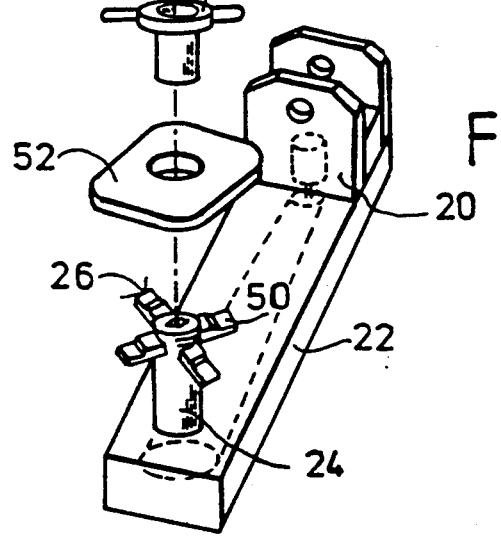
FIG. 2 is an exploded view of a part of the apparatus.

The wheel holder shaft 26 is rotatable, preferably by means of a motor, which, as shown in dotted lines in FIG. 2, is mounted in the base portion 20 and which, through a chain drive out through the box-shaped arm 22, drives a chain wheel mounted on the shaft 24, while the said rigid core pin in the tubular shaft 24 projects from the outer side of the box arm 22.

In FIG. 1 it is indicated that a foot pedal 62 may be used for operating the apparatus, but as the apparatus portions may carry out many different movements, the apparatus will furthermore comprise a non-illustrated control board from which the different movements may be controlled. This applies to the height positioning of the bracket 18 and thereby of the entire wheel carrier arm 22 as well as to the angular motion of the latter about the bracket 18 and thereby the angular position of the wheel holder 26, and optionally also to the position of the pressure disc 16 relative to the tire edge of the wheel mounted on the holder 24.

It will be appreciated that a wheel, and even a large, heavy wheel, which is rolled to the apparatus will be easy to place on the wheel holder 26, e.g. when this is moved to the position shown in FIG. 1 in which the adjacent wheel may be brought to engage the wheel holder 26 simply by being leaned against the latter, when the bracket 18 and thereby the wheel holder arm 22 has been brought to assume a height position corresponding to the size of the wheel.

After securing the wheel, this may be pivoted to a horizontal position by a downwards pivoting of the arm base member 20 and an associated upwards pivoting of the wheel holder shaft. When the wheel is in this position the apparatus may be used in the same manner as conventional apparatuses of the type, by which a wheel holder for a horizontal wheel may be raised and lowered, such that thereby, after guiding the pressure disc 16 to a correct position above the tire edge, it is possible to press the tire edge free from the felly edge by moving the wheel holder upwards while turning the wheel. Alternatively the tool arm could be pressed downwards, but it is cheaper to have this mounted at a stationary height, when wheel holder is height movable anyway.

After the said pressing free of the tire it is still possible—in a usual manner—to force the tire edge up above the felly edge by using the tire tool 58,60 while turning the wheel, and if this is sufficient for the work which is to be done on the tire, e.g. for changing an inner tube, it is thereafter possible in a corresponding manner to remount the tire edge and pivot and lower the wheel to an appropriate delivery position, e.g. an inclined, almost vertical position.

If the tire is to be dismounted completely the operation may start by releasing the upper tire edge and forcing it upwards as described, whereafter the wheel is turned by pivoting the arm base portion 20 by 180° to an upwardly projecting position in which the wheel holder shaft is turned downwards correspondingly (FIG. 1). Thereafter it is possible in a corresponding manner to press free the other, now upwardly oriented tire edge, whereby the tire will fall down to a position in which this upper tire edge rests against the lower felly edge. Thereafter the wheel holder and thus the felly with the "hanging" tire may be guided upwards until the pressure disc 16 will cooperate with the top side of the upper tire edge, which thereafter, by a short further raising of the felly, will be pressed down over the lower felly edge, whereby the tire is completely released in a simple manner, merely by falling down on the base plate 2. On this plate may be placed one or more rollers for facilitating the pulling away of the tire.

Because the wheel is turnable both tire edges will be able to cooperate with the same pressure disc, i.e. there is no need to have a supplementary, lower pressure disc which might be difficult to operate or adjust correctly underneath the tire. Moreover, the combined turnability, angle adaptablility, and height movability of the wheel holder will be usable with substantially more advantages than what is mentioned here, e.g. also when handling wheels with locking rings, but in the present connection it appears unnecessary to disclose these advantages further.

The invention is not limited to the wheel holder being pivotal as here described, but it will be appreciated that the shown system is advantageous by the fact that the turning of the tire may be effected with an almost minimal space requirement, just as it is advantageous that the wheel by being turned will be placed approximately in the same position with respect to the pressure disc, i.e. with respect to both the front and the back side of the tire.

It must be emphasized that the disclosed loosening of the tire with the aid of gravity is connected with a substantially reduced need for pressure force compared to a dismounting in a horizontal or a vertically upward direction.

I claim:

1. A tire mounting and dismounting apparatus including a base, a support means mounted on said base, a carrier means mounted on said support means, a rotatable wheel holder mounted on said carrier means on which a wheel felly may be fastened, tool means including a pressure disc means mounted on said support means for pressing free a tire edge from a felly edge and a universal tool means mountable on said wheel holder for forcing a tire edge over a felly edge by the mounting and dismounting of a tire in response to the wheel holder being rotated, means for mounting the carrier means so as to enable the carrier means to be height adjustable relative to the base and pivotal relative to the support means in such a manner that an axis of the wheel holder is pivotal in a substantially vertical plane through a horizontal plane between an obliquely or straightly upwardly projecting position and an obliquely or straightly downwardly projecting position, and wherein the universal tool means are mountable on said wheel holder so as to be operative relative to the wheel felly fastened to the wheel holder in both the upwardly and downwardly projecting positions thereof.

2. An apparatus according to claim 1, wherein said carrier means includes a generally horizontally disposed arm member, the wheel holder projects perpendicularly from a lateral surface of said arm near a free end of said arm member, and wherein said means for mounting the carrier element is arranged at an end opposite the free end of the arm member so as to enable the arm member to be pivotal about an axis substantially parallel to a longitudinal direction of the arm member.

3. An apparatus according to claim 2, wherein said means for mounting said carrier means includes a bracket pivotably mounted on said support means to the opposite end of the arm member, and wherein said bracket projects from said support means on the same side as the wheel holder and is mounted to the support means such that the pivot axis passes through or near to a wheel felly holding area of the wheel holder.

4. An apparatus according to claim 2, further comprising means for rotating the wheel holder located inside said arm member.

* * * * *